May 2, 1961 — R. C. STRAUSS — 2,982,382
MOTOR CONTROL MECHANISM
Original Filed Feb. 29, 1952 — 2 Sheets-Sheet 1

INVENTOR.
BY Raymond C. Strauss

May 2, 1961 R. C. STRAUSS 2,982,382
MOTOR CONTROL MECHANISM
Original Filed Feb. 29, 1952 2 Sheets-Sheet 2

INVENTOR.
BY Raymond C. Strauss

United States Patent Office 2,982,382
Patented May 2, 1961

2,982,382

MOTOR CONTROL MECHANISM

Raymond C. Strauss, Ann Arbor, Mich.
(301 W. Lenawee, Lansing, Mich.)

Original application Feb. 29, 1952, Ser. No. 274,107, now Patent No. 2,831,555, dated Apr. 22, 1958. Divided and this application Jan. 10, 1956, Ser. No. 558,286

2 Claim. (Cl. 192—3)

This invention relates to means for automatically regulating the flow of motive power to a motor on operation of the brake control of a motor driven vehicle, and is adapted for use with all types of motor driven vehicles, such as automobiles, busses, trucks and the like driven by fuel such as gasoline and diesel oil, and by motive power such as steam and electric energy.

Numerous means have been proposed for controlling the operation of throttle limiting devices upon operation of the brake control. These means have been designed to prevent waste of fuel and to increase the safety element. In certain of these devices, the brake and throttle pedals have been mounted in close proximity and in a common plane. This type of mounting has been proposed to reduce the reaction time to a minimum and permits the application of pressure to the brake pedal in the minimum time period.

One of the objects of this invention is to provide means for preventing the flow of motive power to the motor above the normal amount; for example, of fuel to the internal combustion engine above idling speed, upon application of pressure to the brake pedal.

Another object of this invention is to provide means whereby the throttle pedal may be depressed along with the brake pedal without permitting the flow of motive power to the engine above idling speed.

A further object of this invention is to provide means whereby the brake pedal and throttle pedal may be disposed in the conventional manner, may be disposed in close proximity or may or may not be disposed in a common plane.

A further object of the invention is to provide means for preventing the flow or limiting the flow of motive power to the engine above idling speed controlled by fluid pressure, mechanical action or electrical energy.

Another object of this invention is to provide means whereby the driver of a vehicle may fix or set the hand throttle and when the brake is applied, the motive power; for example, the fuel supply, is automatically reduced to that which is normal for idling speed.

Other objects and advantages of this invention will become apparent from the following description and claims taken in conjunction with the drawings, wherein:

Figure 1:
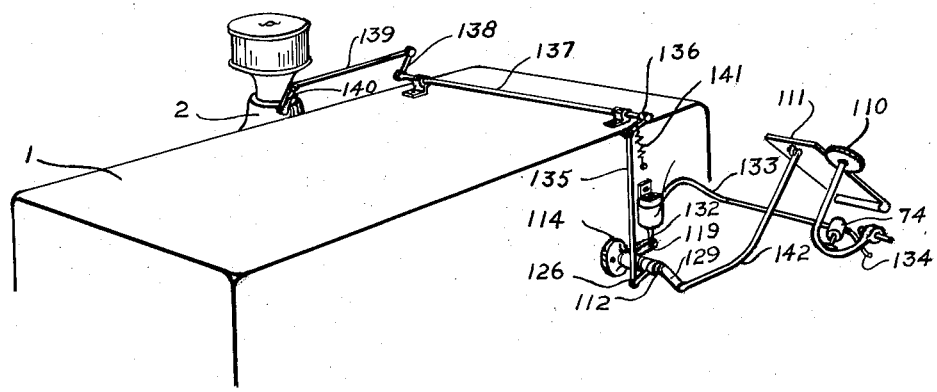
Figure 1 is a perspective view of a linkage system for reducing the fuel fed to the engine upon application of the brake pedal.
Figure 2:
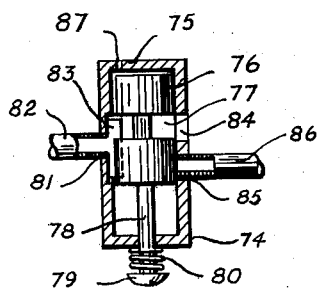
Fig. 2 is a sectional view of the vacuum control valve of Fig. 1.

In the various figures, the engine or motor block is designated by the numeral 1 and the carburetor by the numeral 2.

In the construction illustrated in Figs. 1 to 4, there is shown a series of cooperating cams controlled by a diaphgarm. The brake pedal 110 and accelerator pedal 111 are mounted in the conventional manner. The cam assembly 112 and diaphragm chamber 113 are mounted on the motor block 1. A bracket 114 is secured to the motor block 1 and a shaft 115 is mounted in the bracket. The shaft 115 is provided with a longitudinally extending groove or keyway 116. A collar 117 is provided with a projecting cam 118 and is rotatably mounted on the shaft 115. A lever 119 is secured to the collar. If desired, a washer 120 may be interposed between the bracket 114 and collar 117. A second collar 121 having an integral key 122 is mounted on the shaft, the key registering with keyway 116. The collar 121 is provided with a cut-out segment 123 which conforms to the projecting cam 118 and is adapted to receive the cam 118. The collar 121 is adapted to slide along shaft 115.

A collar 124 is rotatably mounted on shaft 115 and is provided with a cut-out segment 125. A lever 126 is secured to collar 124. A collar 127 is rotatably mounted on shaft 115 and is provided with a projecting cam 128. The cut-out segment 125 is adapted to receive cam 128. A lever 129 is secured to collar 127. A washer 130 may be disposed between collar 127 and nut 131 which maintains the collars in position on the shaft 115. For illustrative purposees, the elements are shown slightly separated in Fig. 3.

Lever 119 is pivotally secured to pin 132 which is secured to the diaphragm within chamber 113 and projects from the chamber. The diaphragm chamber communicates with valve 74 by means of conduit 133. The valve 74 communicates with a source of vacuum by means of conduit 134. Lever 126 is connected with the carburetor valve shaft through rod 135, arm 136, shaft 137, arm 138, link 139 and arm 140. A tension spring 141 is preferably secured to the motor block 1 at one end and to arm 135 at its opposite end to constantly urge the carburetor valve and collar 124 into normal or throttle position. Lever 129 is connected with accelerator pedal 111 by means of push rod 142.

Figure 3:
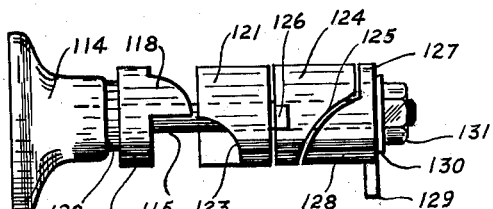
Fig. 3 is an elevational view of a further control unit.
Figure 4:
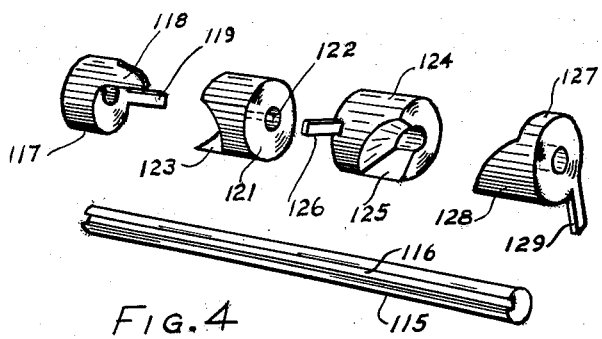
Fig. 4 is a perspective view of the elements illustrated in Fig. 3 in which the elements are shown separated.

The normal position of the cams is illustrated in Fig. 3. Cam 118 bears against collar 121 thereby retaining cam 128 in cut-out segment 125 of collar 124. Upon application of pressure to accelerator pedal 111, collar 127 is rotated in a clockwise direction. Cam 128 carries with it collar 124 and through lever 126 and the intermediate elements causes an opening of the carburetor valve. Upon application of pressure to the brake pedal 110, valve 74 connects diaphragm chamber 113 with the source of vacuum and pin 132 is drawn into the chamber. Collar 117 and cam 118 are thereby rotated so that cam 118 registers with cut-out segment 123. The force of spring 141 is sufficient to cause the cut-out segment 125 in collar 124 to ride along cam 128 and simultaneously move collar 124 and collar 121 along the shaft 115 whereby the carburetor valve is brought to its idling position. The positioning or movement of collar 127 and cam 128 is thereby ineffective in affecting the opening of the carburetor valve until the cam assembly is returned to normal position. Upon release of pressure from the brake pedal, valve 74 opens diaphragm chamber 113 to the atmosphere and pin 132, collar 117 and cam 118 are returned to their normal position. Cam 118 rides on the arcuate surface of cut-out segment 123 forcing collars 124 and 127 into their normal cooperative positions.

Figure 5:
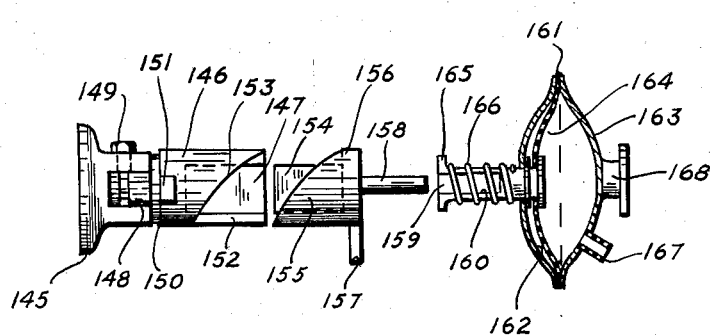
Fig. 5 is an elevational view of a further form of control unit, the elements being shown separated.
Figure 6:
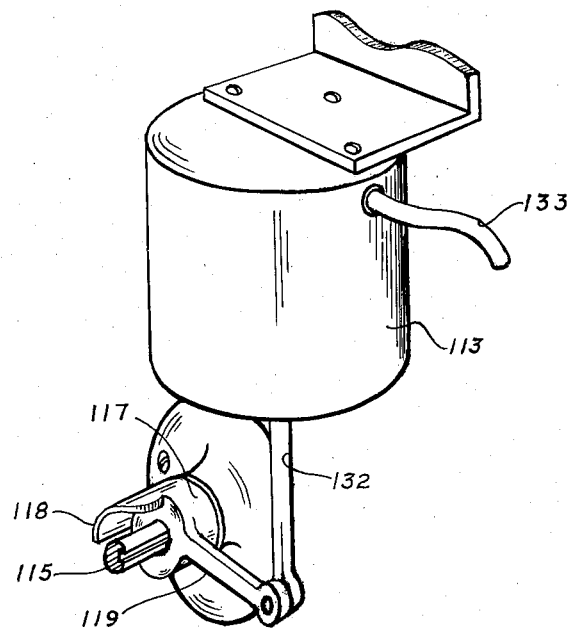
Fig. 6 is a perspective view of the diaphragm element of Fig. 1.

In Fig. 5, there is illustrated (in exploded condition) a modification of the control mechanism shown in Figs.

1 to 4. The bracket 145 is adapted to be secured to the motor block 1. A cylindrical cam element 146 having a hollow core 147 is rotatably secured to bracket 145 by grooved shaft 148 and set screw 149. If desired, a washer 150 may be interposed between cam element 146 and bracket 145. Lever 151 is secured to the cam element 146. A segment 152 is cut from the cylindrical element to form a cam surface 153.

A cylindrical element 154 provided with a circumferential cam 155 cooperates with cam element 146. The cylindrical element 154 and cam 155 may be integral with a flange 156. A lever 157 may be secured to flange 156. A coaxial shaft 158 is also preferably integral with flange 156 and is adapted to be received by duct 159 of pin 160.

The diaphragm chamber 161 comprises a pair of dished plates 162 and 163. An elastic diaphragm 164 is securely clamped between the dished plates. A pin 160 is securely fastened to the diaphragm and projects through an aperture in the plate 162. The outer end of pin 160 may be provided with a flange 165. A compression spring 166 is preferably positioned on the pin 160 between flange 165 and plate 162 to constantly urge the pin into the position illustrated. Plate 163 is provided with a port 167 which communicates with a valve 74. Plate 163 is secured to a bracket 168 which is secured by suitable means to the motor block or other suitable fixed member. Lever 151 is connected by suitable cranks and links to the carburetor shaft in a manner similar to that used in connecting lever 126 in Fig. 1. Lever 157 is connected to the accelerator pedal in the same manner as used in connecting lever 127.

In the normal operative position of the elements, flange 156 abuts against the open end of cylindrical element 146 and cam 155 is in contact with surface 153. Shaft 158 is positioned in duct 159 and is secured to pin 160 by a cotter pin or other suitable means, not shown.

Pressure applied to the accelerator pedal causes an opening of the carburetor valve in the same manner as the operation of the device of Fig. 1. Upon application of pressure to the brake pedal, a vacuum is drawn in the diaphragm chamber and the diaphragm 164 draws pin 160 inwardly. Cam 155 is thereby removed from cooperating position with surface 153 and pressure applied to the accelerator pedal is ineffective in affecting the carburetor valve.

This application is a division of applicant's copending application, Serial No. 274,107, filed February 29, 1952, now Patent No. 2,831,555 issued April 22, 1958, which in turn is a division of his Serial No. 553,274, filed September 8, 1944, now Patent No. 2,642,166.

What is claimed is:

1. In an automobile or the like having a carburetor, an accelerator pedal, and a brake, the combination of a first longitudinally movable rod connected to the accelerator pedal for movement thereby, a second longitudinally movable rod connected to the carburetor to actuate the same, a lost motion type connection interconnecting the rods comprising a first pivotal crank connected to the first rod to be pivoted thereby, a second pivotal crank connected to the second rod to move the same, co-acting radial surfaces on the cranks extending axially thereof having an abutment engagement with each other whereby pivotal movement of the first crank may be transmitted to the second and pivotal movement of the second crank in an opposite direction may be transmitted to the first, at least one of the cranks being axially movable whereby said surfaces may be engaged and disengaged, resilient means holding the surfaces in engagement, and means connecting the brake to the axially movable crank whereby actuation of the brake moves the same in a direction to disengage said surfaces.

2. A disconnect device comprising a first pivotal crank, a second pivotal crank mounted on the same axis as the first, one of the cranks being adapted for connection to a carburetor or the like and the other for connection to an accelerator or the like, said cranks having abutting surfaces whereby they may be jointly rotated in one direction upon the application of torque to only one of the cranks, and means adapted to be actuated by a brake pedal or the like for axially moving one of the cranks to separate said abutting surfaces and thereby discontinue said joint rotation, said means comprising a pivotal member having a projection thereon, a pivotal pressure member having a recess for receiving the projection, said pressure member engaging one of the cranks to hold them in axial engagement, on such engagement said projection being out of said recess, and means whereby said pivotal member is rotated upon actuation of the brake to allow said projection to enter said recess.

References Cited in the file of this patent
UNITED STATES PATENTS

| | | |
|---|---|---|
| 1,247,299 | Loomis | Nov. 20, 1917 |
| 2,040,716 | Summers | May 12, 1936 |
| 2,094,383 | Staude | Sept. 28, 1937 |
| 2,200,685 | Anderson | May 14, 1940 |
| 2,203,777 | Detwers | June 11, 1940 |
| 2,556,485 | Robnett | June 12, 1951 |
| 2,621,766 | Patrick | Dec. 16, 1952 |
| 2,642,166 | Strauss | June 16, 1953 |